(12) United States Patent
Ui

(10) Patent No.: US 8,279,310 B2
(45) Date of Patent: Oct. 2, 2012

(54) SOLID-STATE IMAGING DEVICE AND CAMERA SYSTEM

(75) Inventor: Hiroki Ui, Tokyo (JP)

(73) Assignee: Sony Corporation, Tokyo (JP)

( * ) Notice: Subject to any disclaimer, the term of this patent is extended or adjusted under 35 U.S.C. 154(b) by 812 days.

(21) Appl. No.: 12/211,283

(22) Filed: Sep. 16, 2008

(65) Prior Publication Data

US 2009/0073279 A1    Mar. 19, 2009

(30) Foreign Application Priority Data

Sep. 18, 2007    (JP) ................... 2007-241318

(51) Int. Cl.
 *H04N 3/14* (2006.01)
(52) U.S. Cl. .................. 348/294; 358/482; 358/483
(58) Field of Classification Search .............. 348/294; 358/482, 483
 See application file for complete search history.

(56) References Cited

U.S. PATENT DOCUMENTS

| | | | | |
|---|---|---|---|---|
| 7,525,585 B2* | 4/2009 | Murakami et al. | ............ | 348/294 |
| 7,705,898 B2* | 4/2010 | Kuroda | ............ | 348/296 |
| 2005/0224843 A1* | 10/2005 | Boemler | ............ | 257/233 |

* cited by examiner

*Primary Examiner* — Scott J Sugarman
*Assistant Examiner* — Vipin Patel
(74) *Attorney, Agent, or Firm* — SNR Denton US LLP

(57) ABSTRACT

A solid-state imaging device includes: a pixel array including pixel circuits arranged in a matrix; and a pixel drive unit configured to drive the pixel array to perform a reset of the pixel array, a signal storage, and an output operation. The pixel drive unit includes a pixel reset control portion to supply a signal for resetting a pixel to the pixel circuits of a plurality of rows. The pixel reset control portion performs a reset control so that a row in which the reset signal is cancelled and a row in which the reset signal is continued always exist in one reset row change operation, and a row in which the reset signal continues to be supplied exists during two or more reset row change operations.

11 Claims, 16 Drawing Sheets

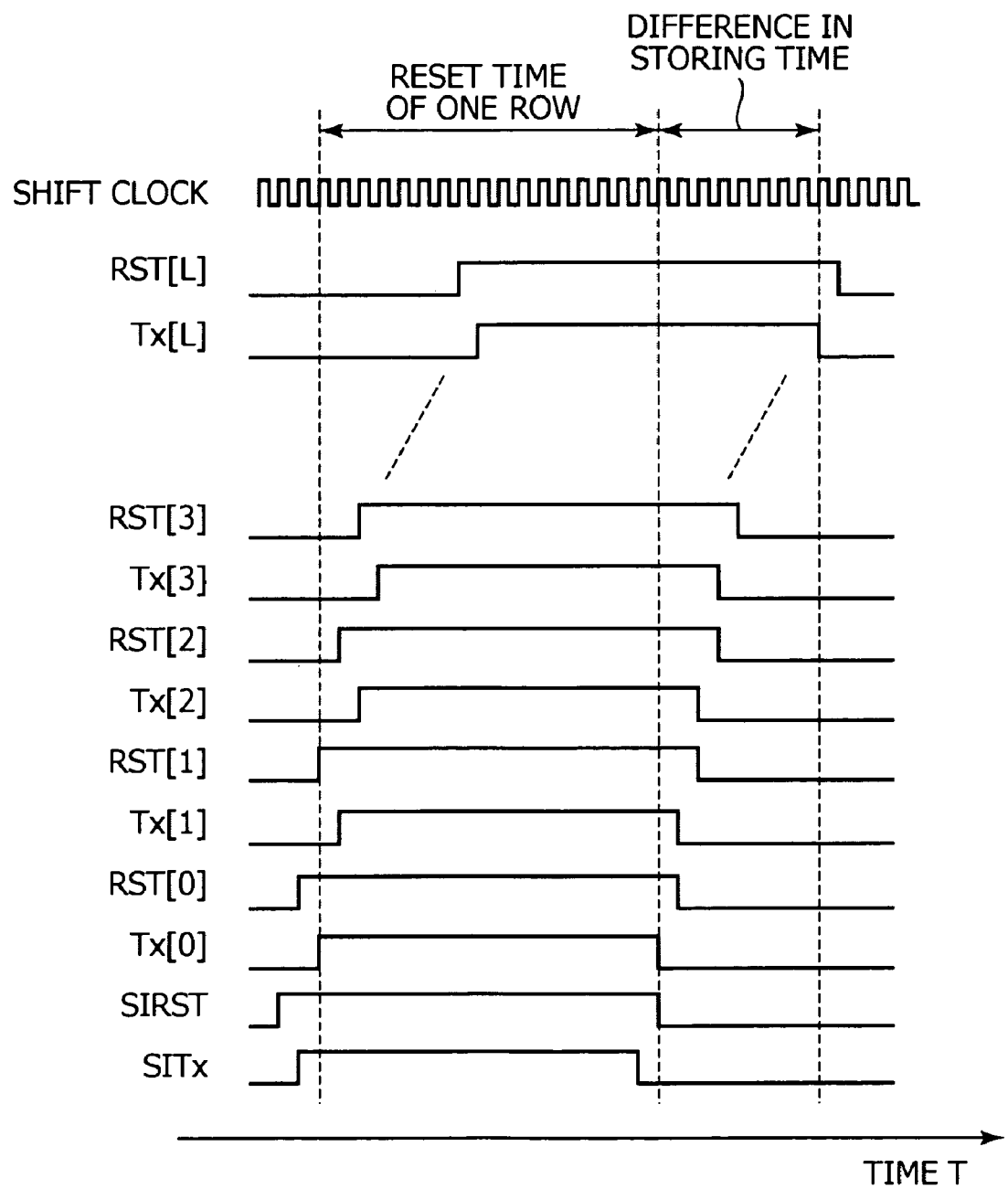

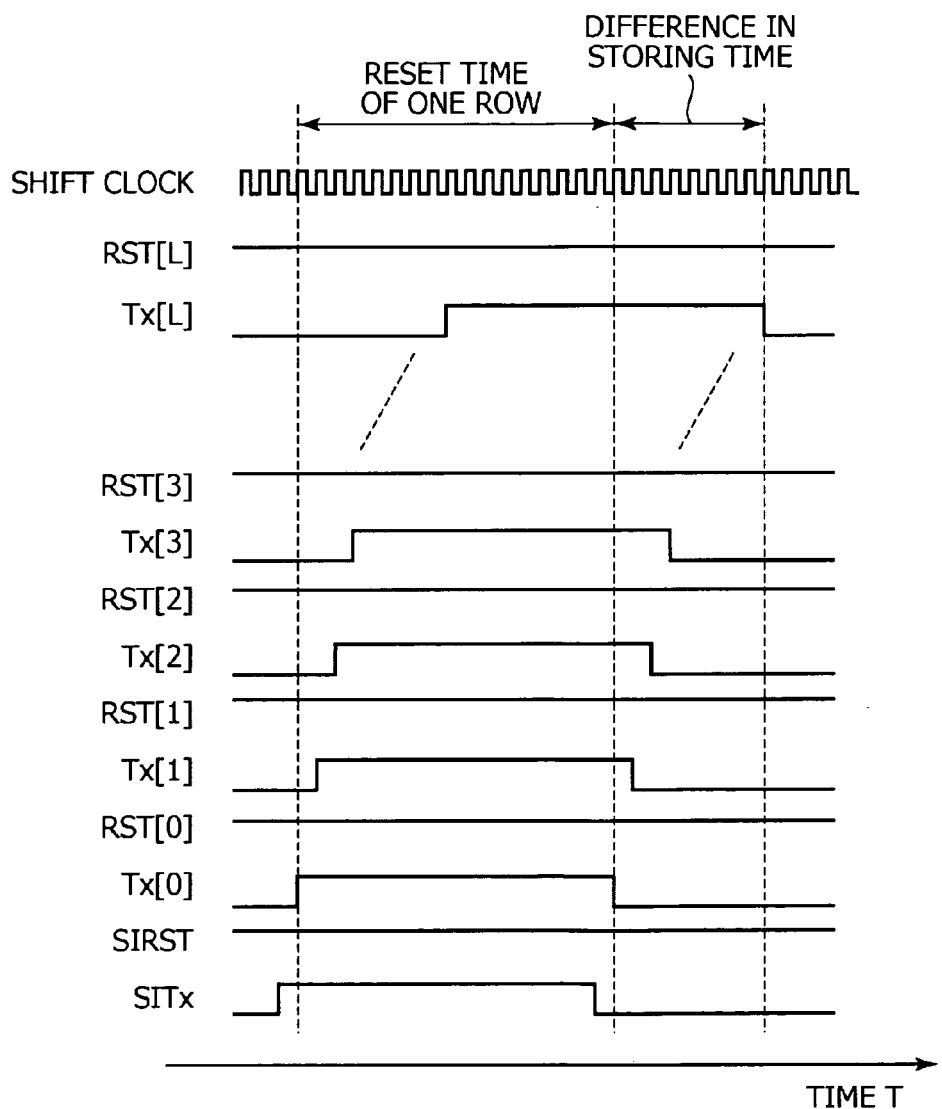

SOLID-STATE IMAGING DEVICE AND CAMERA SYSTEM

CROSS-REFERENCE TO RELATED APPLICATIONS

The present application claims benefit of priority of Japanese patent Application No. 2007-241318 filed in the Japanese Patent Office on Sep. 18, 2007, the entire disclosure of which is incorporated herein by reference.

BACKGROUND OF THE INVENTION

1. Field of the Invention

The present invention relates to a solid-state imaging device represented by a complementary metal-oxide semiconductor (CMOS) image sensor and a camera system.

2. Description of Related Art

In recent years, the CMOS image sensor attracts attention as a solid-state imaging device (image sensor) which may replace charge-coupled device (CCD).

This is because the CMOS image sensor solves problems that a system is complicated considerably since a dedicated process is necessary for the manufacture of a CCD pixel, a plurality of power supply voltages are necessary for the operation, and it is necessary to combine and operate a plurality of peripheral ICs.

The manufacture of CMOS image sensors can use the same manufacturing process as that of a general CMOS type integrated circuit. CMOS image sensors may be driven with a single power supply. Further, an analog circuit and a logic circuit using a CMOS process may coexist in the same chip, and therefore it has a plurality of significant advantages that the number of the peripherals ICs can be reduced.

An output circuit of CCD mainly provides one channel (ch) output using an FD amplifier which has a floating diffusion layer (FD: Floating Diffusion). On the other hand, the CMOS image sensor includes the FD amplifier for each pixel, and the output is mainly of a column parallel output type in which a row in a pixel array is selected and pixels therein are simultaneously read out in a column direction. This is because it is difficult for the FD amplifier arranged in the pixel to obtain a sufficient drive capability, and therefore it is necessary to lower a data rate and parallel processing is considered to be advantageous.

In general, in the case of resetting the pixel in the CMOS image sensor, a method is often employed in which the pixels are reset one by one for each row (this method is hereafter referred to as "rolling shutter"). A rolling shutter operation will be described with reference to a particular circuit example.

FIG. 1 is a diagram showing an illustrative embodiment of the pixel of the CMOS image sensor composed of four transistors.

This pixel 1 includes a photoelectric conversion element 11 composed of a photo-diode, for example. Each one of the photoelectric conversion elements 11 includes four transistors as active elements, i.e., a transfer transistor 12, a reset transistor 13, an amplification transistor 14, and a selection transistor 15.

The photoelectric conversion element 11 performs photoelectric conversion of incident light to an electric charge (herein electron) corresponding to an amount of the light.

The transfer transistor 12 is connected between the photoelectric conversion element 11 and the floating diffusion FD. By supplying a drive signal to the gate (transfer gate) through a transfer control line LTx, the electron resulting from the photoelectric conversion by the photoelectric conversion element 11 is transferred to the floating diffusion FD.

The reset transistor 13 is connected between a power supply line LVDD and the floating diffusion FD. By supplying a reset signal to the gate through a reset control line LRST, a potential of the floating diffusion FD is reset to a potential of the power supply line LVDD.

A gate of the amplification transistor 14 is connected to the floating diffusion FD. The amplification transistor 14 is connected to an output signal line 16 via the selection transistor 15. The amplification transistor 14 and a constant current supply outside pixel array constitute a source follower.

When an addressing signal (selection signal) is supplied to a gate of the selection transistor 15 via a selection control line LSEL to turn the selection transistor 15 on, the amplification transistor 14 amplifies the potential of the floating diffusion FD, and outputs a voltage according to the potential to the output signal line 16. The voltage outputted from each pixel via the output signal line 16 is outputted to a column circuit (column processing circuit).

A reset operation of this pixel is such that the transfer transistor 12 is turned on to transfer the electric charge accumulated in the photoelectric conversion element 11 to the floating diffusion FD, so that the electric charge accumulated in the photoelectric conversion element 11 is discharged.

In this case, the floating diffusion FD turns on the reset transistor 13 to discard the electric charge to the power supply side in advance so that the electric charge of the photoelectric conversion element 11 can be received in advance. Alternatively, while the transfer transistor 12 is turned on, the reset transistor 13 may be turned on simultaneously to discard the electric charge directly to the power supply.

The series of the operations may be simply referred to as "pixel reset operation".

On the other hand, in a readout operation, the reset transistor 13 is first turned on to reset the floating diffusion FD, and outputs it to the output signal line 16 via the selection transistor 15 which is turned on in the state. This is referred to as P phase output.

Next, the transfer transistor 12 is turned on to transfer the electric charge accumulated in the photoelectric conversion element 11 to the floating diffusion FD, and the output is outputted to the output signal line 16. This is referred to as D phase output.

A difference between the D phase output and the P phase output is obtained outside the pixel circuit and considered as an image signal by cancelling reset noises of the floating diffusion FD.

For the sake of brevity, the series of operations may be simply referred to as "pixel readout operation".

FIG. 2 is a diagram showing an illustrative embodiment of a general structure of the CMOS image sensor (solid-state imaging device) in which the pixels of FIG. 1 are arranged in the shape of a 2-dimensional array.

A CMOS image sensor 20 of FIG. 2 includes a pixel array unit 21 in which the pixel circuits as shown in FIG. 1 are disposed in a two-dimensional array, a pixel drive circuit (vertical drive circuit) 22, and a column circuit (column processing circuit) 23.

The pixel drive circuit 22 controls the turn-on/turn-off of the transfer transistors 12, the reset transistors 13, and the selection transistors 15 of the pixels of each row.

The column circuit 23 receives data of a pixel row readout-controlled by the pixel drive circuit 22, and transfers the data to the latter signal processing circuit.

FIG. 3 is a chart showing a timing chart of the rolling shutter operation of the circuit as shown in FIG. 2.

As shown in FIG. 3, the pixel reset operation is performed in turn for each row, following which the pixel readout operation is performed in turn for each row.

The pixel of each row stores a signal in the photoelectric conversion element during the pixel reset operation and pixel readout operation, and the signal is read out by the pixel readout operation.

SUMMARY OF THE INVENTION

However, as can be seen from FIG. 3, a length of a signal storing period of each row is equal; however, the storing time varies.

Thus, when a moving object is image-captured, there is a problem that the image of the moving object becomes distorted.

Since it is necessary for the pixel reset operation to synchronize with the pixel readout operation, the storing time difference is generally rate-determined in accordance with the pixel readout operation.

In order to cope with the problem of the image distortion, a rolling shutter and a mechanical shutter (hereafter may be referred to as "mecha-shutter") may be used together.

FIG. 4 is a chart showing an example of a timing chart when using the rolling shutter and mechanical shutter together.

In this operation, all pixels are subjected to the pixel reset operation simultaneously (exposure start). After the exposure time, the mechanical shutter is closed (exposure end), and then the readout operation is performed.

In this operation, since the timings of the exposure start and end are simultaneous for all pixels, the image distortion is not a problem.

In this case, however, since all pixels are subjected to the pixel reset operation simultaneously, a large amount of current flows into a sensor instantaneously.

It is difficult to design the power supply for the sensor; for example, a sufficient large power supply wiring width inside the sensor is required to respond to the instantaneous current etc. In addition, it is required to design an external power supply for supplying the power to the sensor to respond to the large instantaneous current.

Thus, in an existing technology, there is a disadvantage that the image is distorted because of the rolling shutter operation, and even if the mechanical shutter is used together in order to avoid it, a difficulty arises at designing the power supply for the sensor and the system to correspond to the large amount of instantaneous current.

Accordingly, the present invention provides a solid-state imaging device and a camera system in which the instantaneous current at the time of the reset operation can be inhibited without causing the difficulty in design, to thereby allow power consumption to be reduced.

In accordance with one aspect of the present invention, a solid-state imaging device includes a pixel array including a plurality of pixel circuits, arranged in a matrix, for converting a light signal into an electric signal and storing the electric signal according to exposure time, and a pixel drive unit configured to drive the pixel array to perform a reset of the pixel array, a signal storage, and an output operation. The pixel drive unit performs a pixel reset control to supply a signal for resetting a pixel to the pixel circuits of a plurality of rows. The pixel reset control is performed so that a row in which the reset signal is canceled and a row in which the reset signal is continued always exist in one reset row change operation, and a row in which the reset signal continues to be supplied exist during two or more reset row change operations.

It is preferable that, in the reset control of the pixel drive unit, a time interval of the reset row change operation is constant.

Further, it is preferable that, in the reset control of the pixel drive unit, a time interval of the reset row change operation is variable.

Furthermore, it is preferable that, in the reset control of the pixel drive unit, a time interval of the reset row change operation is not constant.

Still further, it is preferable that, in the reset control of the pixel drive unit, a time interval of the reset row change operation is partly or entirely variable in the reset row change operation.

It is preferable that the pixel drive unit includes a shift register for designating a reset row, the shift register designate a plurality of reset rows by inputting continuous row designating signals, and the reset row change operation is a shift operation of the shift register.

The pixel drive unit preferably performs output control of the signal for resetting the pixel so that a shift-in of the row designating signal to the shift register is performed in synchronization with a shift clock so as to be sequentially shifted, and the row in which the reset signal is canceled and the row in which the reset signal is continued may always exist in one reset row change operation, and the row in which the reset signal continues to be supplied may exist during two or more reset row change operations.

It is preferable that the pixel drive unit includes a circuit for designating a single or a plurality of row addresses, and propagates a designation signal outputted from the circuit to another row to thereby designate a plurality of reset rows.

It is preferable that the circuit for designating the row address includes a shift register.

Further, it is preferable that the circuit for designating the row address includes an address decoder of a combination logic circuit.

In accordance with another aspect of the present invention, a camera system includes a solid-state imaging device, an optical system for forming a photographic subject image at the imaging device, and a signal processing circuit for processing an output image signal of the imaging device. The solid-state imaging device includes a pixel array including a plurality of pixel circuits arranged in a matrix, wherein each of the pixel circuits converts a light signal into an electric signal and stores the electric signal according to exposure time, and a pixel drive circuit configured to drive the pixel array to perform a reset of the pixel array, a signal storage, and an output operation. The pixel drive unit performs a pixel reset control to supply a signal for resetting a pixel to the pixel circuits of a plurality of rows. The pixel reset control portion performs so that a row in which the reset signal is canceled and a row in which the reset signal is continued always exist in one reset row change operation. The pixel reset control portion also performs so that a row in which the reset signal continues to be supplied may exist during two or more reset row change operations.

In embodiments of the present invention, by the pixel reset control of the pixel drive unit, the row in which the reset signal is canceled and the row in which the reset signal is continued always exist in one reset row change operation. The row in which the reset signal continues to be supplied exists during two or more reset row change operations.

According to embodiments of the present invention, the instantaneous current at the time of the reset operation can be inhibited without causing the difficulty in design, to thereby allow the power consumption to be reduced.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 8 is a chart showing a timing chart of an operation of the pixel reset control portion according to the first embodiment.

FIG. 9 is a chart showing another timing chart of the operation of the pixel reset control portion according to the first embodiment.

DETAILED DESCRIPTION OF EMBODIMENTS

Hereafter, embodiments of the present invention will be described with reference to the drawings.

First Embodiment

Figure 1:
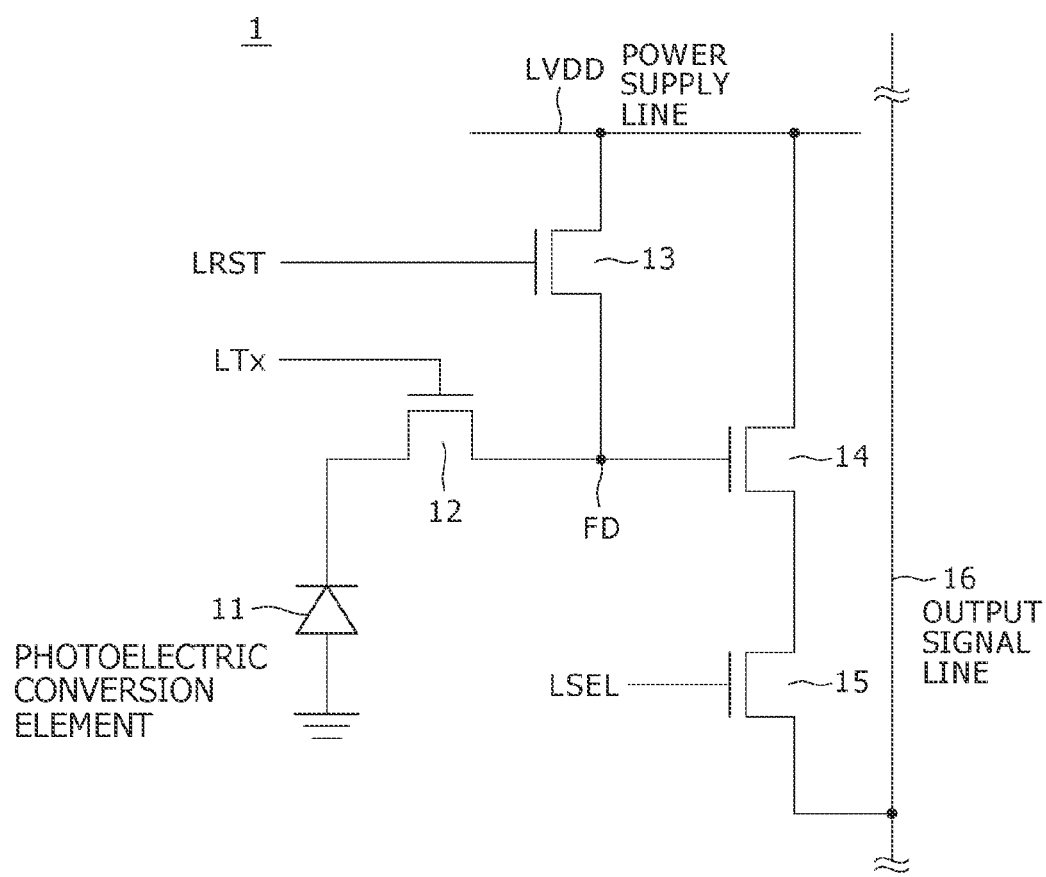
FIG. 1 is a diagram showing an illustrative embodiment of a pixel in a CMOS image sensor which is composed of four transistors.
Figure 2:
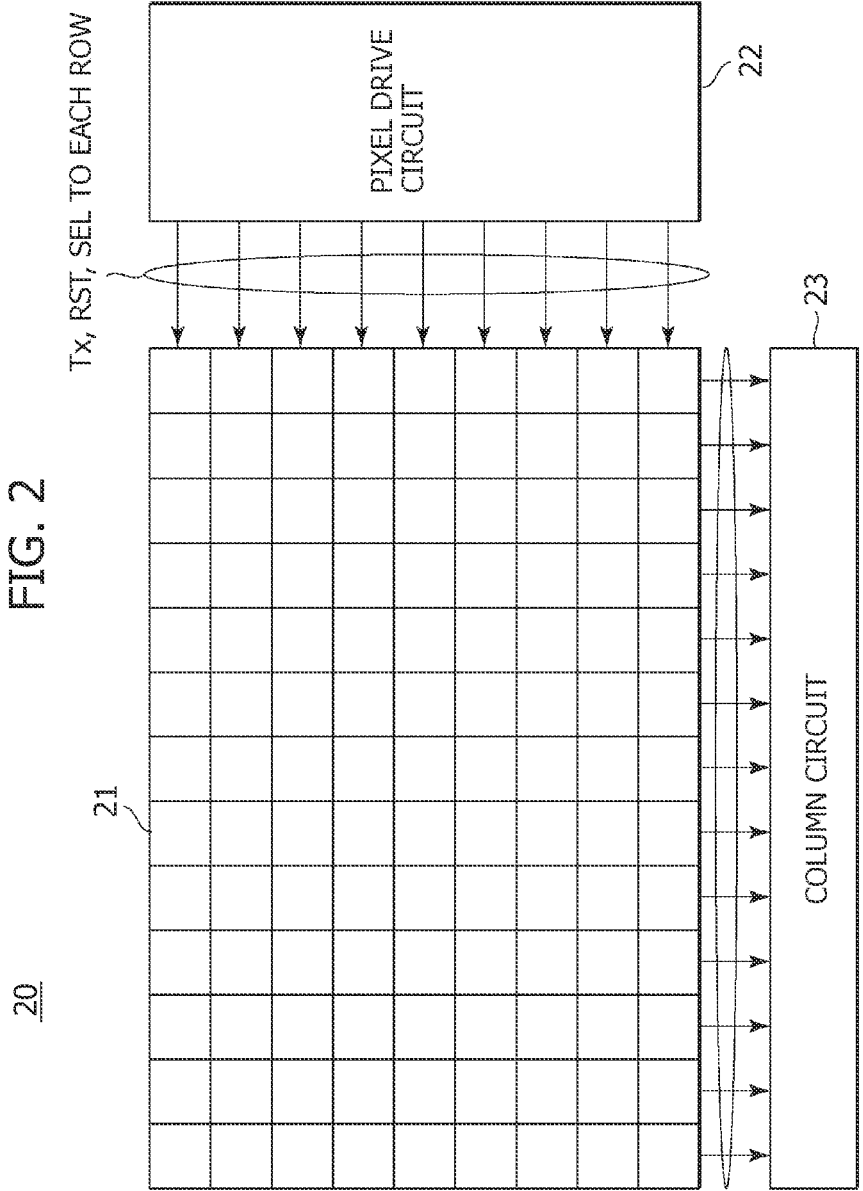
FIG. 2 is a diagram showing an illustrative embodiment of a general structure of the CMOS image sensor (solid-state imaging device) in which the pixels of FIG. 1 are arranged in a two-dimensional array.
Figure 3:
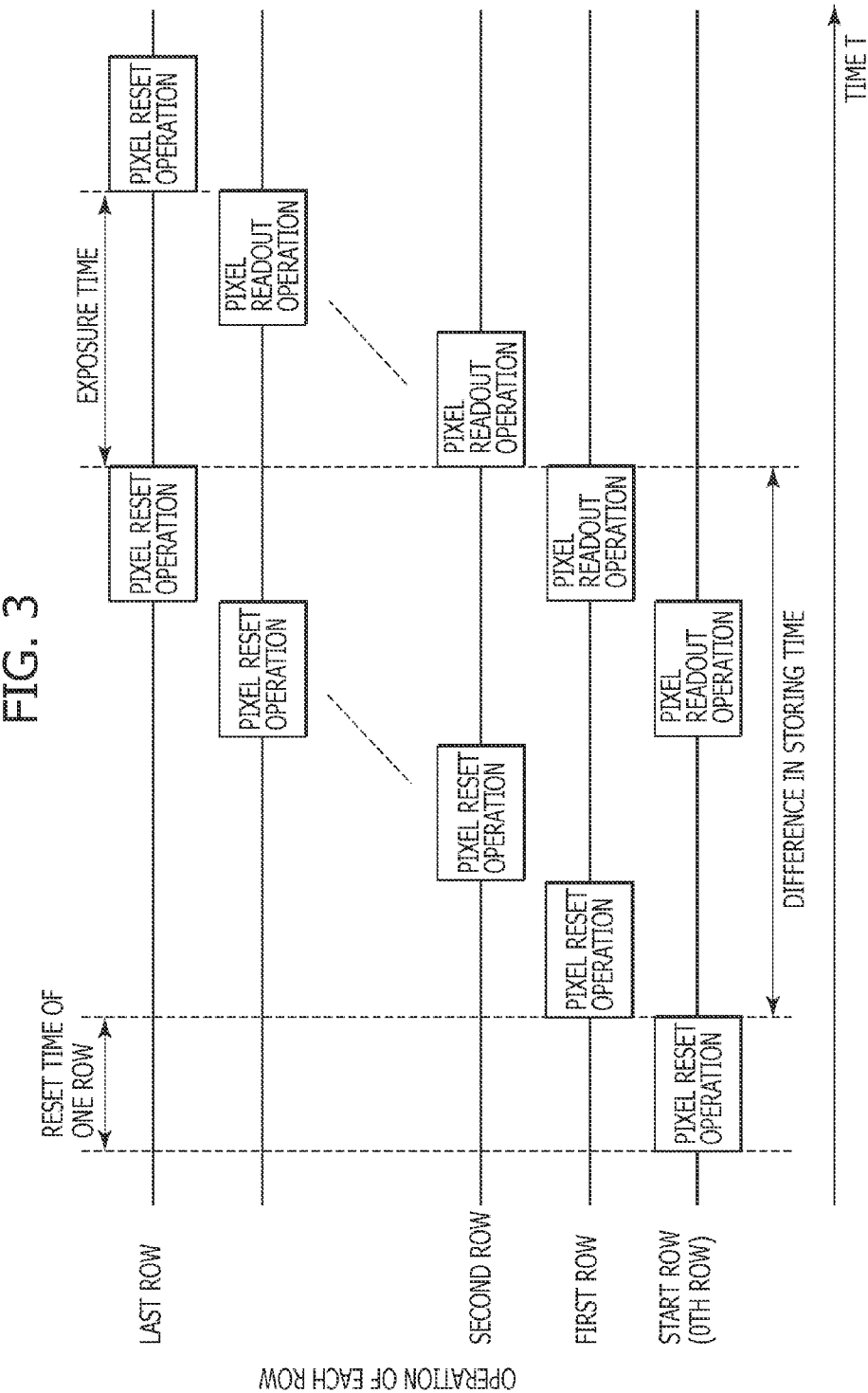
FIG. 3 is a chart showing a timing chart of a rolling shutter operation of the circuit as shown in FIG. 2.
Figure 4:
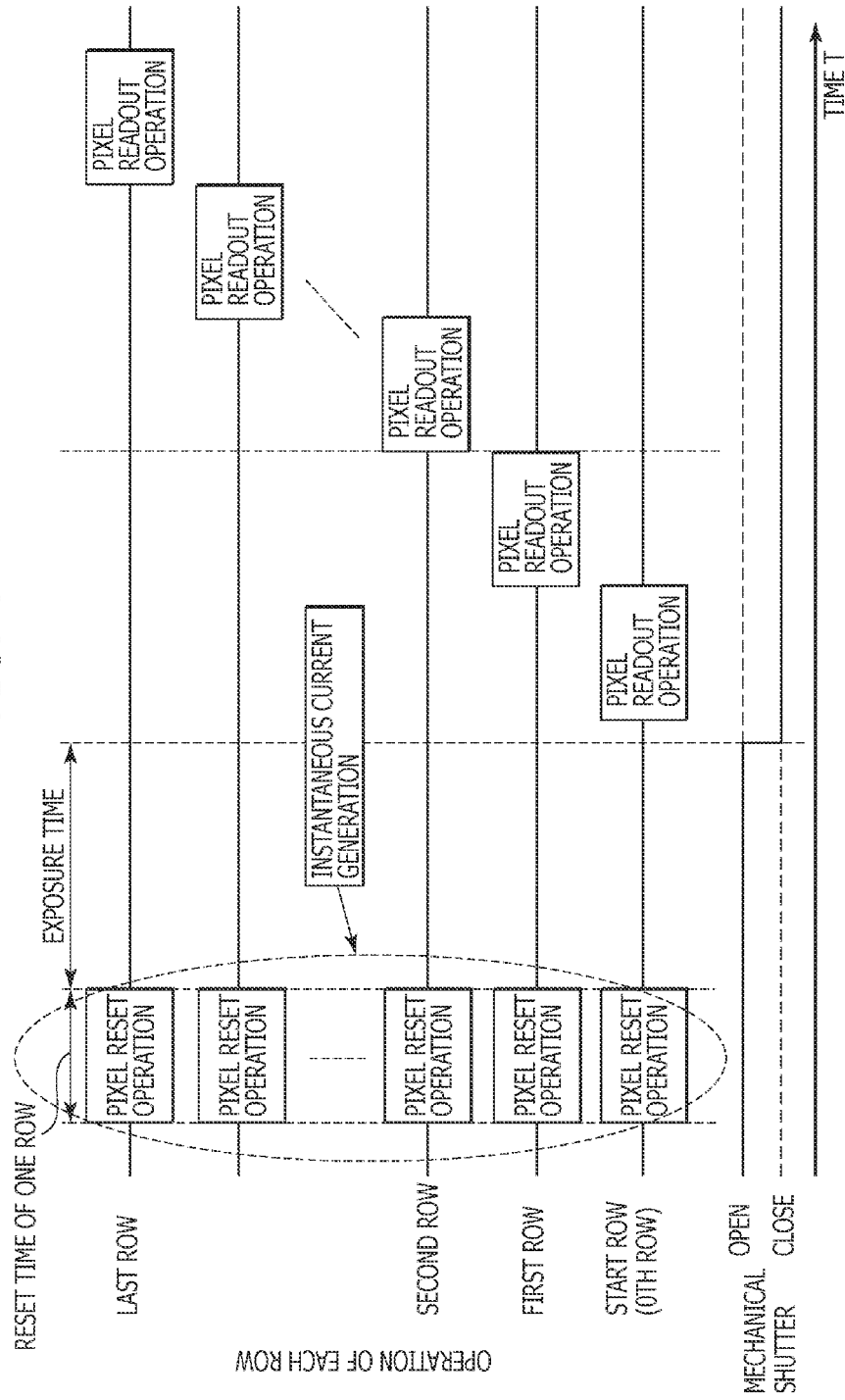
FIG. 4 is a chart showing an example of a timing chart when using a rolling shutter and a mechanical shutter together.
Figure 5:
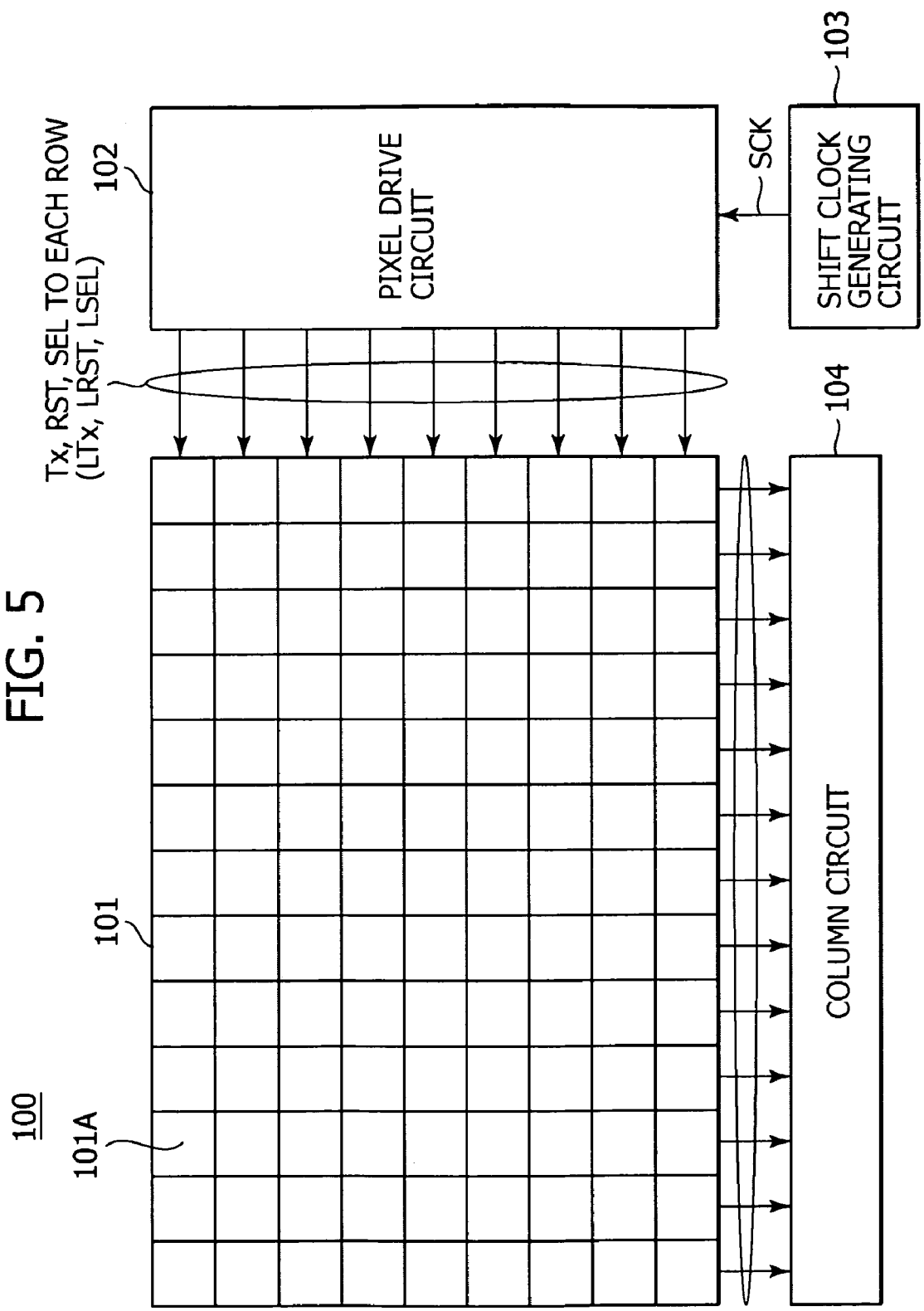
FIG. 5 is a diagram showing a structural example of the CMOS image sensor (solid-state imaging device) according to an embodiment of the present invention.

FIG. 5 is a diagram showing a structural embodiment of a CMOS image sensor (solid-state imaging device) according to an embodiment of the present invention.

This CMOS image sensor 100 includes a pixel array unit 101, a pixel drive circuit (vertical drive circuit) 102 as a pixel drive unit, a shift clock generating circuit 103, and a column circuit (column processing circuit) 104.

In the pixel array unit 101, a plurality of pixel circuits 101A are arranged in a two-dimensional shape (matrix).

Figure 6:
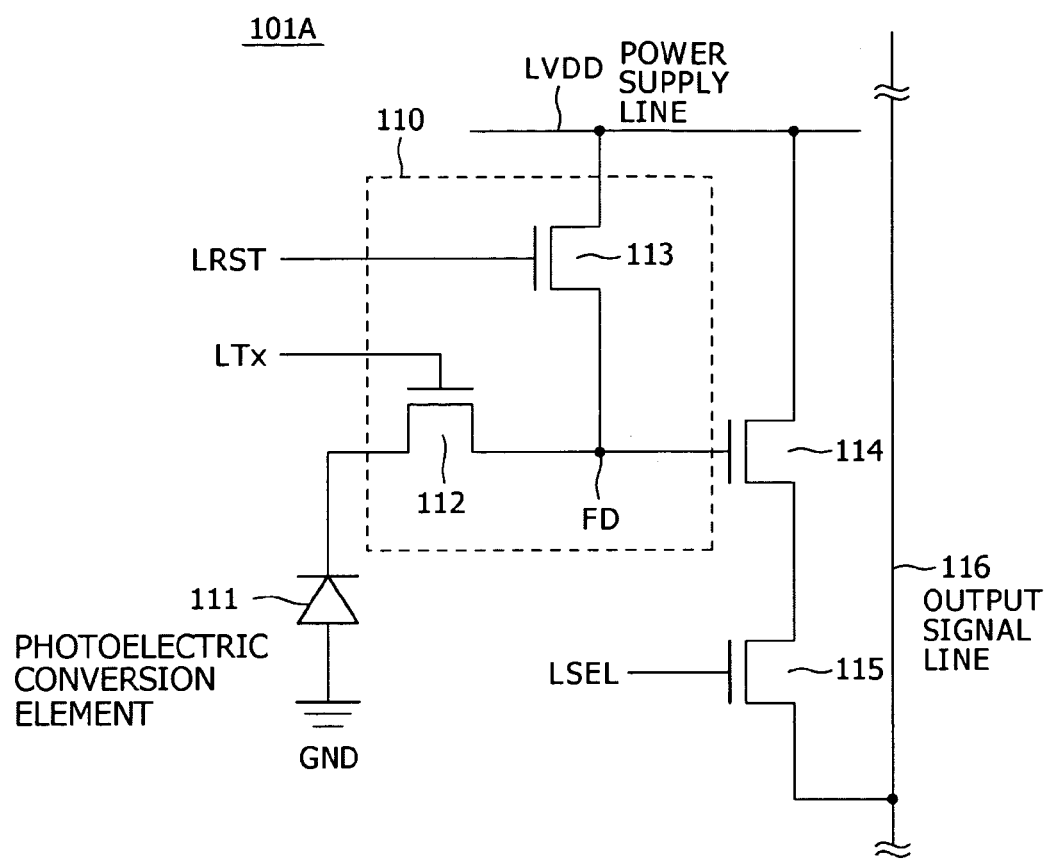
FIG. 6 is a diagram showing an example of the pixel of the CMOS image sensor which is composed of four transistors according to the embodiment.

FIG. 6 is a diagram showing an embodiment of the pixel in the CMOS image sensor which is composed of four transistors according to the present embodiment.

This pixel circuit 101A includes a photoelectric conversion element 111 composed of a photo-diode, for example. Each of the photoelectric conversion elements 111 includes four transistors as active elements; a transfer transistor 112, a reset transistor 113, an amplification transistor 114, and a selection transistor 115.

In the present embodiment, the reset circuit 110 is composed of the transfer transistor 112 and the reset transistor 113 of the four active elements.

Namely, in the present embodiment, to turn on the transfer transistor 112 and the reset transistor 113 is equivalent, in general terms, to an operation of resetting an image in an embodiment of the present invention, and either or both a control signal Tx for controlling and turning on/off the transfer transistor 112 and the control signal RST for controlling and turning on/off the reset transistor 113 is equivalent, in general terms, to the signal for resetting the pixel in an embodiment of the present invention.

The photoelectric conversion element 111 performs photoelectric conversion of incident light to an electric charge (herein electron) according to an amount of the light.

The transfer transistor 112 is connected between the photoelectric conversion element 111 and the floating diffusion FD. When the control signal Tx is supplied to the gate (transfer gate) via the transfer control line LTx to transfer the electron resulting from the photoelectric conversion performed by the photoelectric conversion element 111 to the floating diffusion FD.

The reset transistor 113 is connected between the power supply line LVDD and the floating diffusion FD. When the control signal RST is supplied to the gate via a reset control line LRST to reset a potential of the floating diffusion FD to a potential of the power supply line LVDD.

A gate of the amplification transistor 114 is connected to the floating diffusion FD. The amplification transistor 114 is connected to a signal line LSGN via the selection transistor 115. The amplification transistor 114 and a constant current supply outside the pixel array constitute a source follower.

When a control signal (addressing signal or selection signal) SEL is supplied to a gate of the selection transistor 115 via the selection control line LSEL and the selection transistor 115 is turned on, the amplification transistor 114 amplifies the potential of the floating diffusion FD, and outputs a voltage according to the potential to the signal line LSGN. The voltage outputted from each pixel via the signal line LSGN is outputted to the column circuit 104.

Since each gate of the transfer transistor 112, the reset transistor 113, and the selection transistor 115 is connected on a row by row basis, these operations are simultaneously performed for each pixel for one row.

The reset control line LRST interconnected to the pixel array unit 101, the transfer control line LTx, and the selection control line LSEL are operatively connected as one set on a row by row basis in the pixel arrangement.

The reset control line LRST, the transfer control line LTx, and the selection control line LSEL are driven by the pixel drive circuit 102.

When the whole of the pixel array unit 101 is reset, the pixel drive circuit 102 controls the pixel reset to inhibit the instantaneous current required for the reset operation while securing plane synchronicity of the reset.

The pixel drive circuit 102 includes, for example, a plurality of shift registers for outputting each control signal to a control line to which the respective reset control lines LRST, transfer control lines LTx, and selection control line LSEL is connected.

Under the control of a control system (not shown) according to a control signal CTL, the pixel drive circuit 102 performs the output control of the control signals Tx and RST to the transfer control line LTx and the reset control line LRST so that a shift-in of the row designating signal to the shift register is performed in synchronization with a shift clock SCK from the shift clock generating circuit 103 so as to be sequentially shifted, and the row in which the reset signal is canceled and the row in which the reset signal is continued may always exist in one reset row change operation, and the row in which the reset signal continues to be supplied may exist during two or more reset row change operations.

Further, the pixel drive circuit 102 can control the time interval of the reset row change operation so that it may be constant or variable or may not be constant, or the reset row change operation may be partly or entirely variable, according to the control signal CTL.

In the pixel drive circuit 102 of a first present embodiment, the shift register is used to designate the reset row. By inputting the continuous row designating signals (shift-in pulse signals) into the shift registers, a plurality of reset rows is specified. Further, the reset row change operation is a shift operation of the shift registers.

The pixel reset control of this pixel drive circuit 102 will be further described in detail later.

The shift clock generating circuit 103 generates the shift clock SCK with a frequency of 200 MHz, for example, and supplies it to the pixel drive circuit 102.

The column circuit 104 receives the data of a pixel row which is readout-controlled by the pixel drive circuit 102, and transfers the data to a signal processing circuit located in the subsequent stage.

Hereafter, the pixel reset control which is a characteristic function of the present embodiment will be further described in detail.

Figure 7:
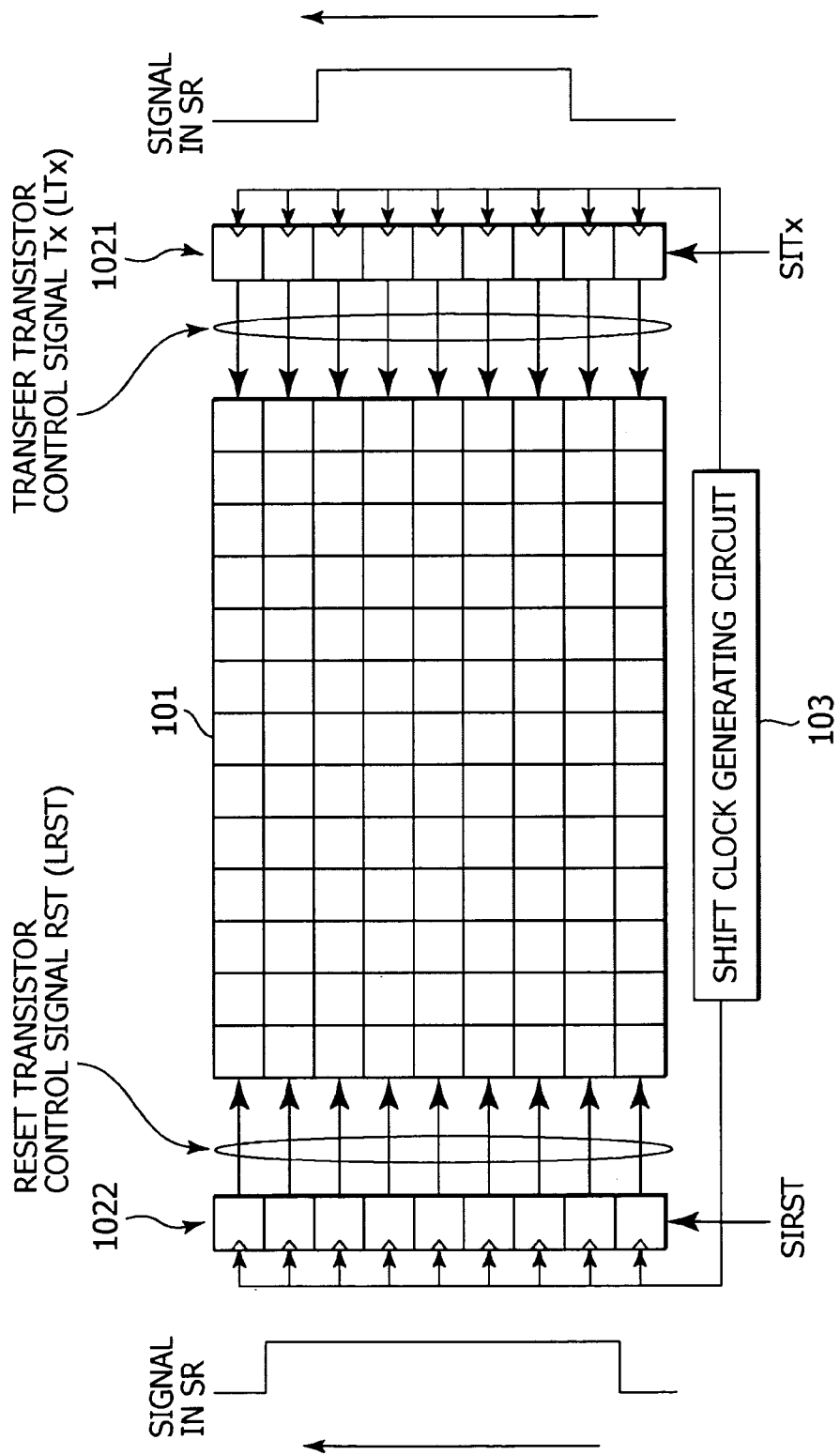
FIG. 7 is a diagram showing a structural example of a pixel reset control portion according to a first embodiment.

FIG. 7 is a diagram showing a structural example of a pixel reset control portion in accordance with the present embodiment.

FIG. 7 selectively shows the pixel array unit 101 in which the pixels are arranged in a two-dimensional matrix, shift registers 1021 and 1022 for generating the control signal Tx for the transfer transistor 112 which constitutes the pixel reset control portion in the pixel drive circuit 102 and the control signal RST for the reset transistor 113, and the shift clock generating circuit 103 for generating the shift clock SCK which cause the shift registers 1021 and 1022 to perform the shift operation.

Accordingly, in FIG. 7, the circuit which generates the control signal SEL (in addition to this, the control signal for the transfer transistor and the control signal for the reset transistor for the pixel readout operation, if required) of the selection transistor 115 for the pixel readout operation, and the column circuit which receives pixel output data are omitted.

In FIG. 7, in order to simplify the drawing and for ease of understanding, the shift register 1021 for controlling the transfer transistor is arranged on the right-hand side of the pixel array unit 101 in the figure, and the shift register 1022 for controlling the reset transistor is arranged on the left-hand side in the figure.

Further, in the present embodiment, although the shift clock generating circuit 103 is provided within the chip, the shift clock may be supplied from outside.

An output unit of the shift register 1021 is operatively connected to each transfer control line LTx interconnected corresponding to each row of the pixel arrangement.

The shift register 1021 controls the output of control signals Tx[0]-Tx[L] to the transfer control line LTx so that a shift-in of the row designating signal to the shift register is performed in synchronization with the shift clock SCK from the shift clock generating circuit 103 so as to be sequentially shifted, and the row in which the reset signal is canceled and the row in which the reset signal is continued may always exist in one reset row change operation, and the row in which the reset signal continues to be supplied may exist during two or more reset row change operations.

Further, an output unit of the shift register 1022 is operatively connected to each reset control line LRST interconnected corresponding to each row of the pixel arrangement.

The shift register 1021 controls the output of control signals RST[0]-RST[L] to a reset control line LRST so that a predetermined shift-in pulse signal SIRST may be shifted one by one by carrying out shift-in in synchronization with the shift clock SCK from the shift clock generating circuit 103, and the row in which the reset signal is canceled and the row in which the reset signal is continued may always exist in one reset row change operation, and the row in which the reset signal continues to be supplied may exist during two or more reset row change operations.

Next, an operation of the pixel reset control portion according to the present embodiment will be described.

FIG. 8 is a chart showing a timing chart of the operation of the pixel reset control portion according to the present embodiment.

The shift clock SCK is supplied to the shift registers 1021 and 1022, and the shift-in pulse signals SITx and SIRST are shifted in the shift registers 1021 and 1022, respectively.

At this time, a time length of the shift-in pulse signal SITx to the shift register 1021 is set up so that it may be larger than a sufficient time length at which the electric charge of the photoelectric conversion element 111 is discarded.

Assuming that consecutive Ntx [bit] in the shift register 1021 turn to "1" by this shift-in pulse signal SITx, a relationship is expressed as follows:

$$\text{Width of SITx} = Ntx \times Tck \geq \text{Time required to begin to discard electric charge of photoelectric conversion element} \quad \text{(Equation 1)}$$

where Tck is shift clock cycle.

It is noted that, in FIG. 8, although the shift-in pulse signal SIRST is considered as the pulse of the width including the shift-in pulse signal SITx, the timings of the discard of the electric charge from the photoelectric conversion element 111, and the signal storing start is determined by the timing of cancelling the control signal Tx of the transfer transistor.

Accordingly, as shown in FIG. 9, for example, the control signal RST of the reset transistor may be fixed at "active" (high-level in the embodiment of FIG. 9).

At this time, a pulse width of the control signal Tx[n] supplied to an arbitrary n-th (arbitrary) row is equal to a width of the shift-in pulse signal SITx, which is sufficient time to discard the electric charge of the photo-diode (photoelectric conversion element) 111 of the row, whereby the pixel is reset.

On the other hand, a difference in storing time in a screen is as follows:

$$Tck \times L \quad \text{(Equation 2)}$$

where L is a number of rows of pixel array.

For example, if a time required for resetting one row is set to 500 ns, L=1000, Tck=5 ns (frequency of shift clock SCK is 200 MHz), an exposure start time difference is set to 5 μs from the above (Equation 2) in the present embodiment.

On the other hand, exposure end time is determined by operating time of the mechanical shutter, and it is of the order of several ms. Thus, the difference in exposure start time is sufficiently small compared with this, the difference in exposure time is determined by operation of the mechanical shutter, and it is possible to consider that exposure time starts simultaneously.

Further, the number of rows which operate simultaneously may be at most approximately two rows, a start row and the last row of the pulses for scanning the inside of the shift register 1021 and the shift register 1022. For example, in the case of the pixel array with 1000 rows, it is expected that momentary consumption current may be approximately $2/1000=1/500$ compared with the existing one when resetting all pixels at the same time.

Although it is necessary to consider a delay of the signal etc. for the ratio of consumption current in fact, it is very small as described above.

Although the constant shift clock SCK is used in the present embodiment, two conditions to consider the exposure start time as simultaneous are that an exposure start time difference is sufficiently small compared with the operating time of the mechanical shutter, and the pixel is provided with a sufficient pulse to discard the electric charge of the photodiode (photoelectric conversion element). If the conditions are satisfied, the cycle of the shift clock does not need to be constant.

Further, it is also possible to change the shift clock in accordance with an operation speed of the mechanical shutter, the clock signal supplied within the system, etc.

For example, in the present embodiment, the frequency of the shift clock SCK is explained as 200 MHz. However, when the frequency of the clock signal in the system is 100 MHz, even if it is changed into the clock signal of a frequency smaller than it, for example, 50 MHz, the exposure start time difference is approximately 20 μs, which means that it is sufficiently small compared with the operation speed of the mechanical shutter. Thus, it is possible to consider that the exposure start time is simultaneous.

In the rolling shutter operation, assigning time required for the reset operation to each row, the reset is performed in turn. Consequently, it is difficult to control the speed at which the reset operation scans within the screen in smaller units than that of the time required for the reset operation. However, in the present embodiment, it can be controlled in units of clock signals with a higher speed.

Second Embodiment

In order to obtain an effect equivalent to that in the first embodiment, it is not necessary to provide "1" for consecutive bits in the shift register, "1" may be inputted only into one bit, and the control signal Tx of the transfer transistor may be propagated over the preceding and following Ntx bits.

Figure 10A:
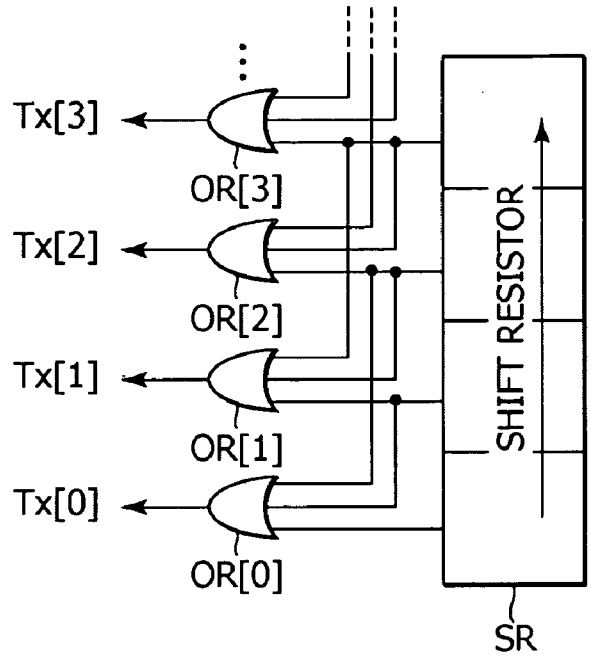
FIG. 10 are diagrams for explaining a second embodiment.

An embodiment of a control signal generating circuit for the transfer transistors in this case is shown in FIG. 10(A).

In FIG. 10A, for the sake of brevity, it is illustrated in the case of Ntx=3. However, it can be constituted similarly even when Ntx is other than three.

In the embodiment of FIG. 10A, it is arranged that three-input OR gates OR[0] to OR[3] (to OR [L]) are disposed at respective output stages of the shift register SR, and "1" is inputted only into one bit, to propagate the control signal Tx of the transfer transistor over the preceding and following Ntx bits.

Figure 10B:
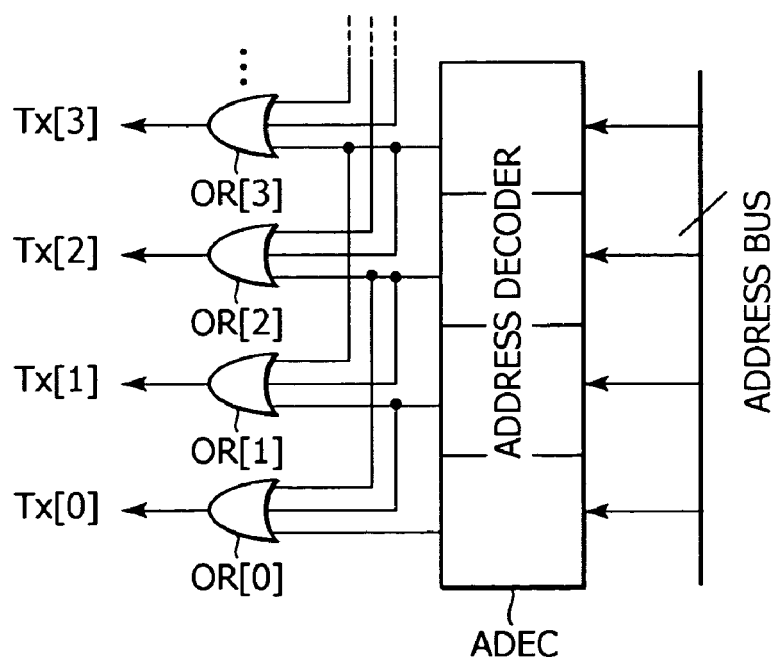

Further, it is clear that the same effect is obtained even if the shift register SR in FIG. 10A is an address decoder ADEC as shown in FIG. 10B.

It is noted that, in the second embodiment and the following, for the sake of brevity, only an embodiment of the control signal generating circuit for the transfer transistors is shown. However, it is clear that the generating circuit is also similar to that for the control signal for reset transistors.

Third Embodiment

In the first and second embodiments, the direction in which the reset operation scans a screen is constant, but is not necessarily constant.

Figure 11:
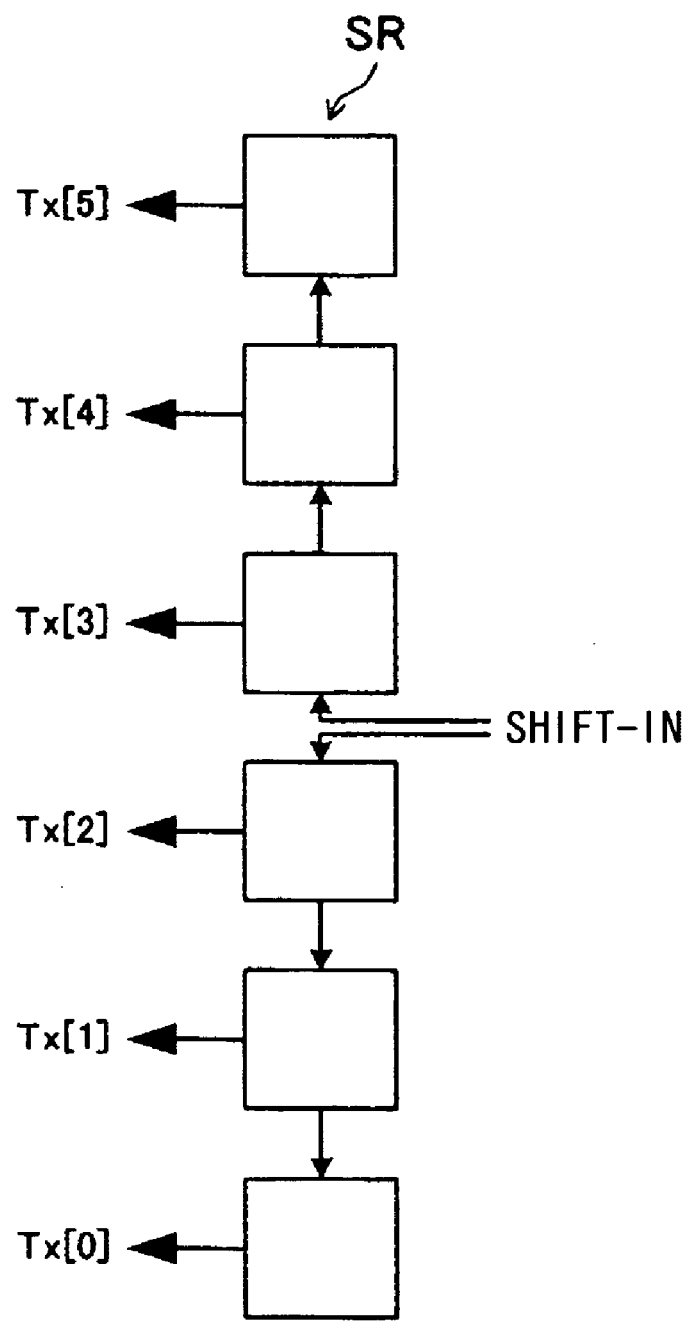
FIG. 11 is a diagram for explaining a third embodiment.

For example, an equivalent effect is obtained, even if it the shift-in starts with the center of the screen and the reset operation scans the screen upward and downward the screen, respectively, as shown in FIG. 11.

In FIG. 11, for the sake of brevity, only the control signal Tx for the transfer transistor is illustrated, but the control signal RST for the reset transistor is quite the same.

Fourth Embodiment

Figure 12:
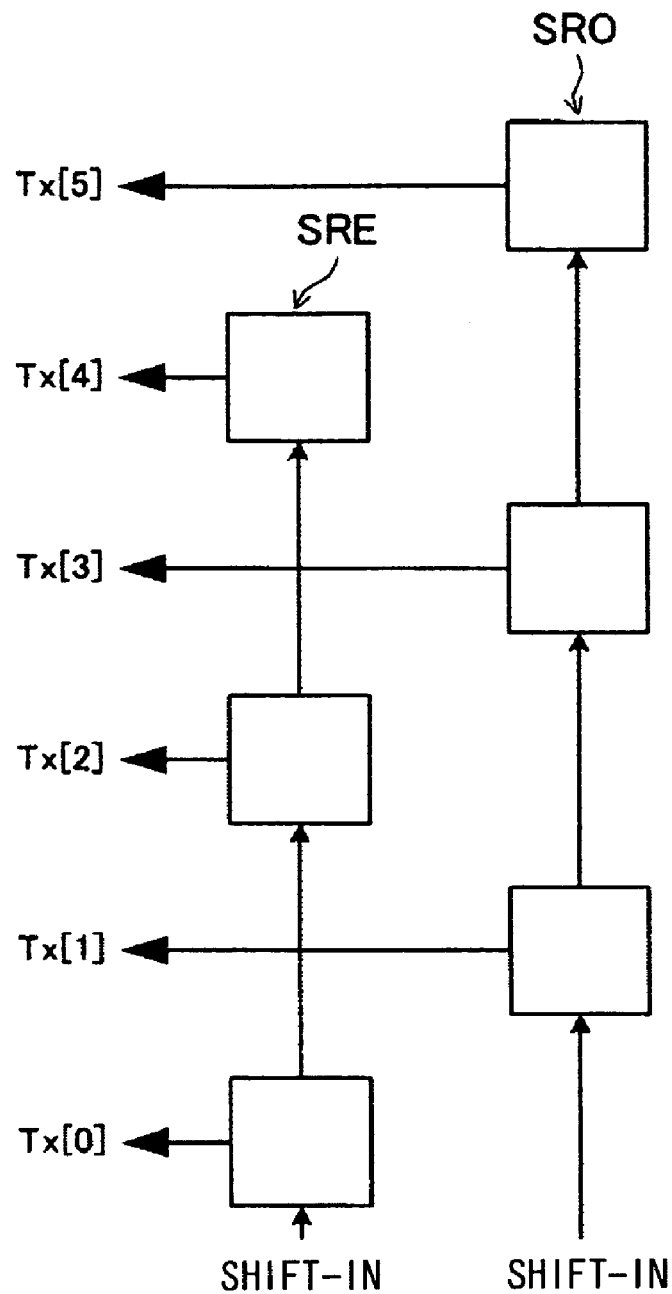
FIG. 12 is a diagram for explaining a fourth embodiment.

FIG. 12 shows a technique of aiming to shorten scanning time of the reset operation for the whole screen to divide the shift register.

In the example of FIG. 12, the shift registers SRE and SRO for generating the control signal Tx for the transfer transistor to an even row and an odd row are separately provided.

Thus, the reset operation of the whole screen can be completed with a half number of shift clocks.

In the fourth present embodiment, although the shift register is divided into two, the scanning time can be further shortened by increasing the number of divisions.

Fifth Embodiment

In the above first to fourth embodiments, once the shift operation starts, the scanning direction is constant. However, the same effect is obtained even if the scanning direction changes during the scanning.

Figure 13:
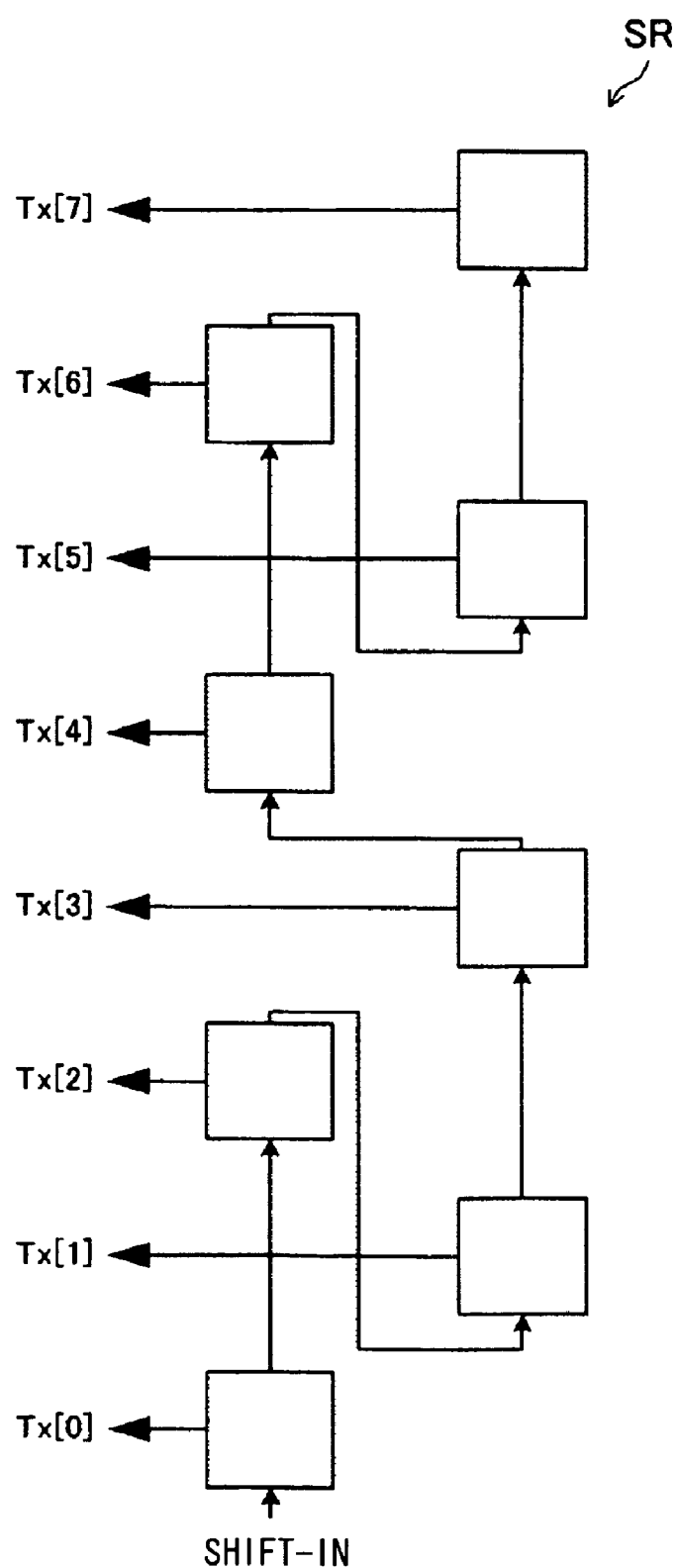
FIG. 13 is a diagram for explaining a fifth embodiment.

FIG. 13 shows an embodiment of a zigzag scanning circuit.

The circuit in the embodiment of FIG. 13 may be used, for example, if two rows of R rows are read out and added together, then two rows of B rows are read out and added together to output the results. For example, it is suitable when the pixels are of a Bayer arrangement.

For example, it is possible to constitute a circuit for switching between the operation of the first embodiment and the operation of the fifth embodiment by providing a switch for switching between connection relationships of the shift register.

Sixth Embodiment

Figure 14:
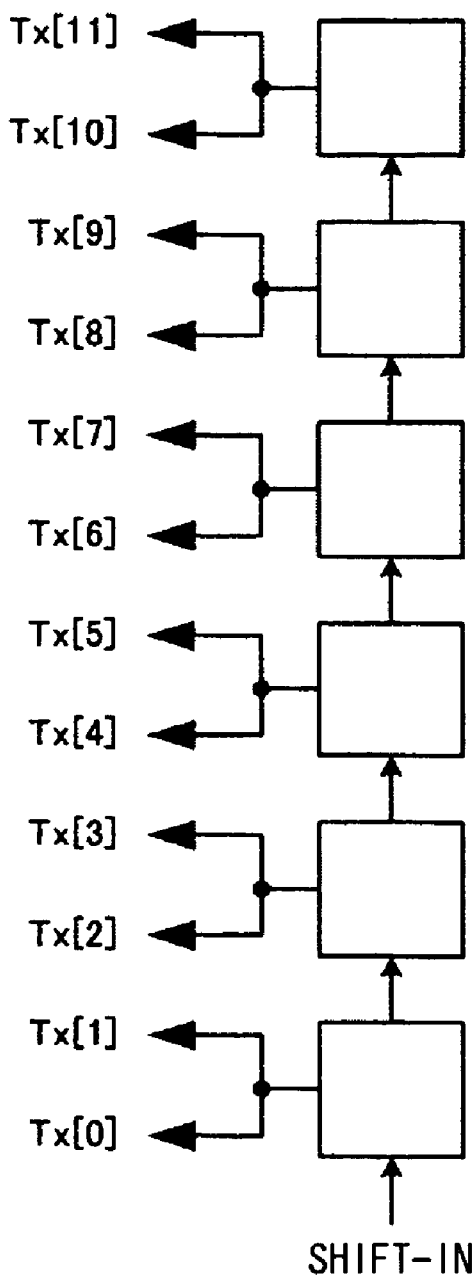
FIG. 14 is a diagram for explaining a sixth embodiment.

As shown in FIG. 14, the pixel reset operation for two rows by one bit of the shift register may be performed.

Similarly, the screen scanning time of the reset operation can be shortened by generating reset operation control signals for a plurality of rows with a 1-bit shift register.

An operation of resetting the plurality of rows simultaneously may be similarly applied to other embodiments.

Seventh Embodiment

As with the examples of FIGS. 7 and 8 as described in the first embodiment, the reset timing is determined by the control signal Tx of the transfer transistor. Thus, the control signal RST of the reset transistor is omitted in the seventh present embodiment.

Figure 15:
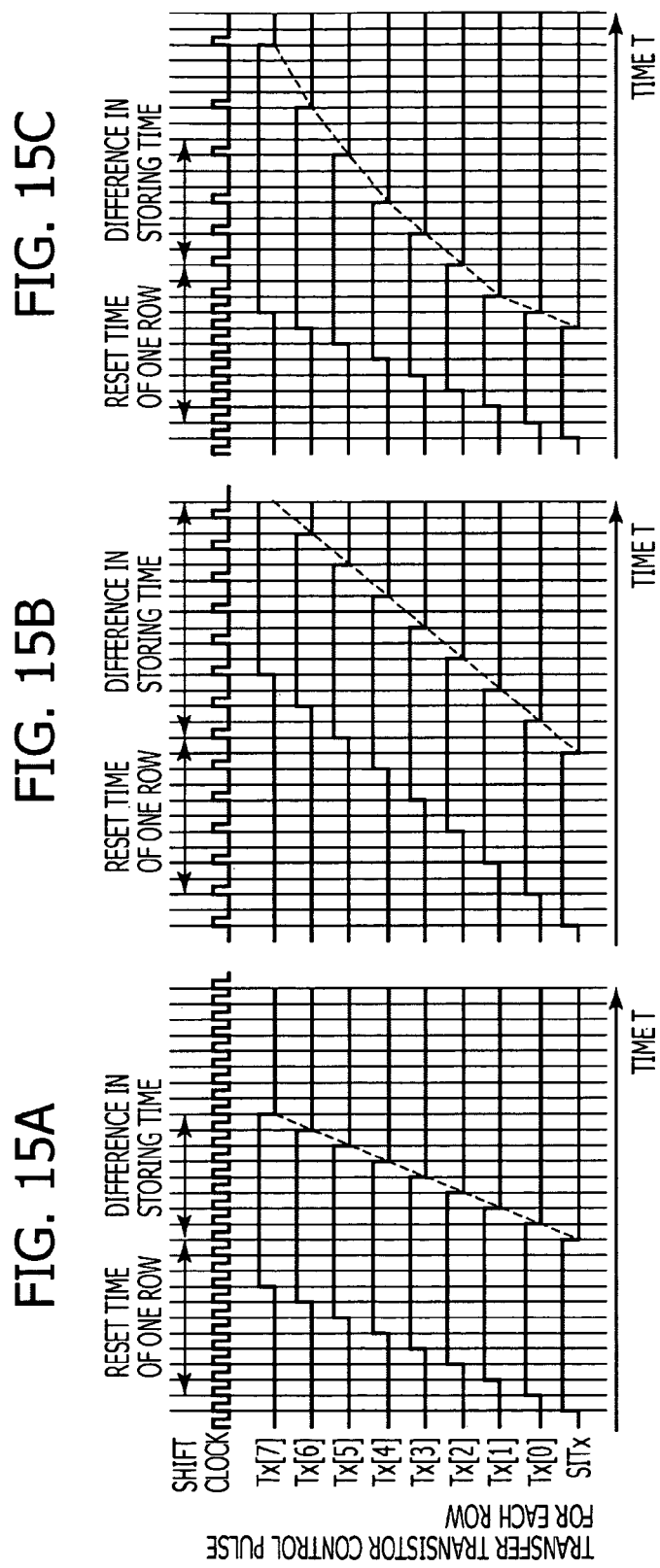
FIG. 15 are graphs for explaining a seventh embodiment.

In the first embodiment, as shown in FIG. 15A, the shift operation is performed in constant units. However, as shown in FIG. 15B, a period of the shift clock can be extended to reduce the shift speed.

For the purpose of reducing the power consumption or the like, if the storing time is long and the storing time difference for each row is not so much of a problem, it is possible to switch from the shift speed as shown in FIG. 15A to that in FIG. 15B, if needed.

Further, as shown in FIG. 15C, it is possible to switch the intervals of the shift clocks during one full screen scan at one time.

Thus, in order to synchronize with other portions of the system provided with the function of an embodiment of the present invention, it is possible to change the scanning speed dynamically.

As described above, according to embodiments of the present embodiments, under the control of the control system (not shown) in accordance with the control signal CTL, the pixel drive circuit 102 performs the output control of the control signals Tx and RST to the transfer control line LTx and the reset control line LRST so that the predetermined row designating signals may be shifted one by one in these shift registers by carrying out shift-in in synchronization with the shift clock SCK from the shift clock generating circuit 103, and the row in which the reset signal is cancelled and the row in which the reset signal continues to be supplied may always exist in one reset row change operation, and the row in which the reset signal is continued may exist during two or more reset row change operations. Thus, while securing the plane synchronicity of the reset operation of the pixel array, the instantaneous current can be inhibited and it is possible to ease the system and the power supply design of the chip.

Further, since the screen operating time of the reset operation can be controlled in smaller units than that of the time required to reset the pixel, it is possible to adjust the reset timing finely.

Although the CMOS image sensor in accordance with each embodiment is not particularly limited but may be arranged as the CMOS image sensor provided with a row parallel type analog-to-digital conversion apparatus (abbreviated to ADC (Analog-to-Digital converter) hereafter), for example.

The solid-state imaging device which has such an effect may be applied to an imaging device for a digital camera or a video camera.

Figure 16:
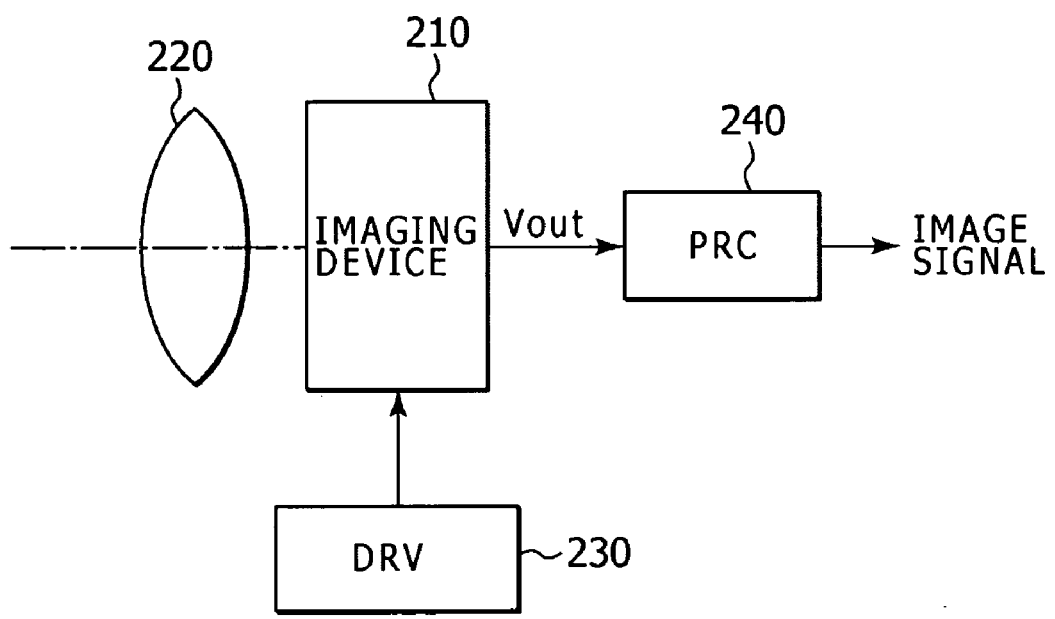
FIG. 16 is a diagram showing a structural example of a camera system to which the solid-state imaging device according to an embodiment of the present invention is applied.

FIG. 16 is a diagram showing a structural example of the camera system to which the solid-state imaging device in accordance with an embodiment of the present invention is applied.

As shown in FIG. 16, this camera system 200 includes an imaging device 210 to which the CMOS image sensor (solid-state imaging device) 100 according to the present embodiment can be applied, an optical system which leads incident light to a pixel area of the imaging device 210 (photographic subject image is formed), for example, a lens 220 which forms the image on an image plane by means of the incident light (image light), a drive circuit (DRV) 230 for driving the imaging device 210, and a signal processing circuit (PRC) 240 for processing an output signal from the imaging device 210.

The drive circuit 230 includes a timing generator (not shown) for generating various types of timing signals including a start pulse for driving a circuit in the imaging device 210, or a clock signal pulse, and drives the imaging device 210 by a predetermined timing signal.

Further, the signal processing circuit 240 performs signal processing of the output signal of the imaging device 210, such as CDS (Correlated Double Sampling).

The image signal processed in the signal processing circuit 240 is recorded on recording media, such as a memory. The picture information recorded on the recording medium is hard-copied by a printer etc. Further, the image signal processed in the signal processing circuit 240 is displayed as a moving image on a monitor constructed by a liquid crystal display etc.

As described above, in an imaging apparatus, such as a digital still camera, a highly precise camera with low power consumption can be achieved by installing the above described imaging device 100 as an imaging device 31.

It is noted that the specific forms and structures of the various parts and the numeric values indicated in each of the embodiments and the above numeral examples are merely given as examples for implementation of embodiments of the present invention. It is therefore to be understood that the technical scope of the present invention should in no way be limited by the above.

What is claimed is:

1. A solid-state imaging device comprising:
   a pixel array including a plurality of pixel circuits arranged in a matrix, each pixel circuit configured to convert a light signal into an electric signal and store the electric signal according to an exposure time; and
   a pixel drive unit configured to drive the pixel array to perform a reset of the pixel array, a signal storage, and an output operation,
   wherein,
   the pixel drive unit includes a pixel reset control portion to supply a signal for resetting a pixel to the pixel circuits of a plurality of rows, and
   the pixel reset control portion performs a reset control so that a row in which the reset signal is cancelled and a row in which the reset signal is continued always exist in one reset row change operation, and a row in which the reset signal continues to be supplied exists during two or more reset row change operations before start of an exposure period.

2. The solid-state imaging device according to claim 1, wherein a time interval of the reset row change operation in the reset control is constant.

3. The solid-state imaging device according to claim 1, wherein a time interval of the reset row change operation in the reset control varies.

4. The solid-state imaging device according to claim 1, wherein a time interval of the reset row change operation in the reset operation is not constant.

5. The solid-state imaging device according to claim 1, wherein a time interval of the reset row change operation in the reset operation varies partly or entirely.

6. The solid-state imaging device according to claim 1, wherein:
   the pixel drive unit includes a shift register for designating a reset row, the shift register designates a plurality of reset rows by inputting continuous row designating signals, and
   the reset row change operation is a shift operation of the shift register.

7. The solid-state imaging device according to claim 6, wherein:
   the pixel drive unit performs an output control of the signal for resetting the pixel so that a shift-in of the row designating signal to the shift register is performed in synchronization with a shift clock so as to be sequentially shifted, the row in which the reset signal is canceled and the row in which the reset signal is continued always exists in one reset row change operation, and the row in which the reset signal continues to be supplied exists during two or more reset row change operations.

8. The solid-state imaging device according to claim 1, wherein the pixel drive unit includes a circuit for designating a single or a plurality of row addresses, and propagates a designation signal outputted by the circuit to another row to designate a plurality of reset rows.

9. The solid-state imaging device according to claim 8, wherein the circuit for designating the row address includes a shift register.

10. The solid-state imaging device according to claim 8, wherein the circuit for designating the row address includes an address decoder of a combination logic circuit.

11. A camera system comprising:
a solid-state imaging device;
an optical system for forming a photographic subject image at the imaging device; and
a signal processing circuit for processing an output image signal of the imaging device,
wherein,
the solid-state imaging device includes a pixel array including a plurality of pixel circuits arranged in a matrix, wherein each of the pixel circuits converts a light signal into an electric signal and stores the electric signal according to an exposure time, and a pixel drive circuit configured to drive the pixel array to perform a reset of the pixel array, a signal storage, and an output operation;
the pixel drive unit includes a pixel reset control portion to supply a signal for resetting a pixel to the pixel circuits of a plurality of rows, and
the pixel reset control portion is performed so that a row in which the reset signal is canceled and a row in which the reset signal is continued always exist in one reset row change operation, a row in which the reset signal continues to be supplied exists during two or more reset row change operations before start of an exposure period.

* * * * *